(12) United States Patent
Hand, Jr. et al.

(10) Patent No.: US 6,957,420 B2
(45) Date of Patent: Oct. 18, 2005

(54) METHOD OF GENERATING TEST SCRIPTS FOR SYSTEMS HAVING DYNAMIC BEHAVIOR

(75) Inventors: Wesley C. Hand, Jr., Londonderry, NH (US); Mark Trumpler, Lexington, MA (US); Eric Noorda, Mont Vernon, NH (US); Albert Seeley, Burlington, MA (US); Kathy Campbell, Lynnfield, MA (US); Nathan W. David, Jacksonville, FL (US); Peter Savage, Mont Vernon, NH (US)

(73) Assignee: E m pirix Inc., Bedford, MA (US)

( * ) Notice: Subject to any disclaimer, the term of this patent is extended or adjusted under 35 U.S.C. 154(b) by 616 days.

(21) Appl. No.: 09/943,640

(22) Filed: Aug. 30, 2001

(65) Prior Publication Data

US 2003/0046626 A1 Mar. 6, 2003

(51) Int. Cl.[7] ................................................ G06F 9/45
(52) U.S. Cl. ........................................ 717/125; 714/32
(58) Field of Search ............................ 717/125; 705/8; 703/13; 709/217; 714/32, 40; 715/500.1; 379/88.11, 20

(56) References Cited

U.S. PATENT DOCUMENTS

| | | | | |
|---|---|---|---|---|
| 5,542,043 | A | * | 7/1996 | Cohen et al. .................. 714/32 |
| 5,771,276 | A | * | 6/1998 | Wolf ........................ 379/88.16 |
| 6,014,428 | A | * | 1/2000 | Wolf ........................ 379/88.11 |
| 6,074,426 | A | * | 6/2000 | Baumgartner et al. ........ 703/13 |
| 6,249,809 | B1 | * | 6/2001 | Bro ............................. 709/217 |
| 6,292,909 | B1 | * | 9/2001 | Hare ............................ 714/40 |
| 6,321,198 | B1 | * | 11/2001 | Hank et al. .................. 704/270 |
| 6,389,126 | B1 | * | 5/2002 | Bjornberg et al. ..... 379/201.03 |
| 6,424,948 | B1 | * | 7/2002 | Dong et al. .................... 705/9 |
| 6,456,699 | B1 | * | 9/2002 | Burg et al. ............... 379/88.17 |
| 6,460,057 | B1 | * | 10/2002 | Butler et al. ............. 715/500.1 |
| 6,647,111 | B1 | * | 11/2003 | Bjornberg et al. ..... 379/220.01 |

OTHER PUBLICATIONS

Template Software Process Template, Using the WFT Development Environment, copyright 1998, Chapters 1–3 and 9.*

Beginning Visual C++ 5, Ivor Horton, Mar. 19, 1997, pp. 129–137.*

Hammer Technologies: "Automated Regression Testing for IVR Applications", Hammer Technology Datasheets, Jan. 2000, XP002219654 Retrieved from Internet.

Empirix Contact Center Test Group: "Hammer IT. Call Center Telephony Testing System", Empirix Datasheets, Feb. 2001, XP002219655, Retrieved from the Internet.

* cited by examiner

*Primary Examiner*—Todd Ingberg
(74) *Attorney, Agent, or Firm*—David W. Rouille, Esq.; Chapin & Huang, L.L.C.

(57) ABSTRACT

A method is disclosed for testing applications that include non-deterministic behavior. The presently disclosed method generates test code for testing deterministic behavior of an application. When instances of non-deterministic behavior of the application being tested are encountered, the method provides acceptable alternate behaviors, such that the non-deterministic behavior can be effectively tested. The method may be implemented as a software test tool that utilizes a graphical programming interface to make the test generation simple and easy to use.

12 Claims, 1 Drawing Sheet

METHOD OF GENERATING TEST SCRIPTS FOR SYSTEMS HAVING DYNAMIC BEHAVIOR

CROSS REFERENCE TO RELATED APPLICATIONS

Not Applicable.

STATEMENT REGARDING FEDERALLY SPONSORED RESEARCH

Not Applicable

1. Field of the Invention

The present invention relates generally to a graphical test design tool and more specifically to a graphical test design tool that accounts for non-deterministic behavior of the application being tested.

2. Background of the Invention

In today's complex telephony environment, computer integrated telephony (CIT) systems have evolved into dynamic systems whose behavior is not always deterministic. The tests designed to exercise these types of applications must be able to foresee the possibility that the application might behave differently under different circumstances.

There are at least two approaches that could be used to generate tests that are capable of handling the dynamic nature of today's applications. The first approach involves manually crafting the tests. While manually creating these tests is possible, this process is both tedious and prone to mistakes, especially over time when maintenance work must be done periodically. Further, this approach is sub-optimal because it requires a skilled programmer to develop the test, and these types of tests are high maintenance. Whenever the application changes, these tests have to effectively be re-written, again by a skilled programmer.

The second approach is to continue to use the test generation software without this new feature and add the additional code necessary to handle the non-deterministic behavior of the application. This is not a desirable solution because the user would lose much of the advantage of using the test generation software in the first place. Hand editing the scripts generated by the software means that when the tests are re-generated, the hand edits are lost and must be re-entered. Regeneration is typically how the tests are maintained when an application changes, so in this case the user would have to decide whether it is better to maintain the tests outside of the test generation software or to use test generation software to regenerate the tests and re-edit the tests to handle the non-deterministic behavior. Either choice has many of the same drawbacks as maintaining manual tests.

It would, therefore, be desirable to provide a test tool that permits the graphical programming of tests for an application that takes into the account the non-deterministic behavior of present day applications, and is simple to use.

SUMMARY OF THE INVENTION

A method is disclosed for designing tests for applications that include non-deterministic behavior. The presently disclosed method provides test code for testing deterministic behavior of an application. When instances of non-deterministic behavior of the application being tested are encountered, the method provides acceptable alternate behaviors, such that the non-deterministic behavior can be effectively tested. The method may be implemented as a software test tool that utilizes a graphical programming interface to make the test generation simple and easy to use.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
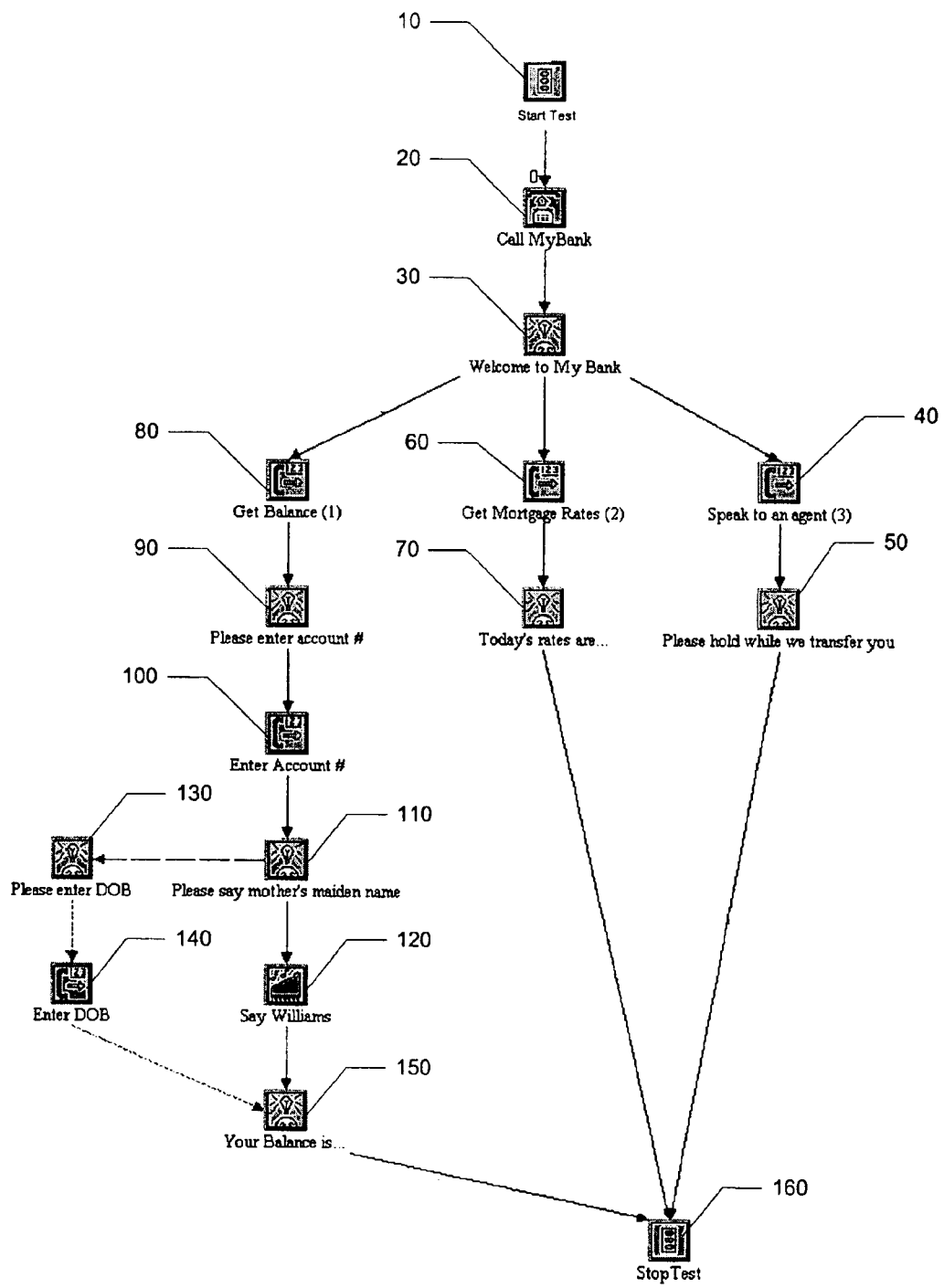
FIG. 1 is a screen shot showing the icons and connectors used to test for deterministic and non-deterministic behavior in an application.

This present invention allows a test programmer to describe non-deterministic behavior of an application in the same environment as deterministic behavior of an application. From this description of the application, a set of tests are automatically generated that both validates the proper responses of the application and accommodates possible alternative responses that are considered equally proper.

Automatic test generation software, for example the Hammer CallMaster available from Empirix Inc. of Waltham, Mass., eliminates the tedious, unreliable and time-consuming process of manual test design and execution by giving users the power to automatically generate and execute tests derived from a call flow diagram. The software reduces test development time thereby enabling rapid, thorough testing of every new and modified IVR application prior to deployment—and to retain and reuse the same set of test scenarios to monitor the application after deployment. The test generation software is particularly useful for test development, execution, and maintenance of complex applications such as the 401K and employee benefits applications required by many financial institutions.

Customer Quality of Experience (QoE) is an essential factor in retaining current customers and attracting new ones. Faults in IVR applications can significantly degrade customer QoE—with potentially disastrous effects on a company's bottom line. Comprehensive development-stage and pre-deployment testing of individual features and feature interactions can detect latent faults in IVR applications before they adversely affect customer QoE. As requirements change or new features are added, the test generation software should ensure that regression test scripts can be rebuilt in minutes, guaranteeing that new application elements won't conflict with existing features. This is particularly useful in assuring the trouble-free deployment of today's modular IVR applications.

By way of the test generation software, test developers create automated tests simply by diagramming an application's call flow using a set of standard and/or custom icons. Using automatic test generation technology, the software then automatically generates a set of test scripts that are used to exercise all or part of the call flow paths and data in the diagram. Tests can be generated to do focused testing on a new feature, or general regression testing of the entire application. The same tests can be used for post-deployment monitoring and maintenance to ensure that the application continues to deliver the highest possible level of customer QoE.

Call flow diagrams are created using a graphical call flow editor in conjunction with a standard library of call flow icons. Each call flow icon contains the test code necessary to execute the call flow action and an appropriate set of default telephony parameters. These parameters can be overridden on either a global or instance basis. Users can also specify the data to be used in the tests.

Today's IVR applications are capable of detecting the environment in which they are executing and modifying their behavior accordingly. Security issues, heavy load conditions and other factors can generate unpredictable or non-deterministic, but still acceptable, behavior in IVR applications. The present invention can generate tests that are capable of accommodating these instances off non-deterministic behavior and continue to test them. By describing the potential alternative behavior of the application within the call flow diagrams, the tests generated are able to accommodate the dynamic behavior and distinguish between acceptable and unacceptable performance.

The present invention allows the user to graphically draw the deterministic behavior using icons and flow connectors, then add additional icons that represent the non-deterministic behavior and connect those icons with test-passed and test-failed connectors.

Alternatively, the user can draw the non-deterministic behavior in a separate picture and reference the picture within the icon representing the deterministic behavior. This approach gives the user the greatest flexibility in terms of deciding how the deterministic and non-deterministic behaviors re-converge once they have diverged. This approach further provides the user the greatest possibility of reuse of the dynamic behavior by configuring multiple icons to reference the same dynamic behavior picture.

Referring now to FIG. 1, an example of how the deterministic and non-deterministic behaviors are represented and tested is shown. A sample call flow diagram for an IVR application is shown. Each icon represents a piece of test code for testing the function represented by the icon. The icons are connected together to form a test script which tests the application.

The first icon 10 provides test code for starting the test. The piece of test code represented by this icon will perform various initialization functions, such as initializing counters, initializing the modem, and the like.

The next icon 20 represents a piece of test code for calling the bank. The test system running the test will dial the phone number of the bank. The piece of code represented by this icon may also determine that the call was placed successfully, and that there wasn't a busy signal, or the call was otherwise not completed or connected.

Icon 30 denotes test code for determining that the call was received properly by the bank. Test code is also provided for determining and that the bank supplied the proper response. At this point the test system is given three choices. The test system is presented with the prompt telling the system that it may push 1 to get a balance, push 2 to get a mortgage rate, or push 3 to speak to a bank agent.

Icon 40 represents test code that is utilized upon the system selecting to speak to a bank agent. The test code generates a tone to the bank similar to the tone produced by pressing a "3" on a touch tone phone.

Icon 50 denotes test code for verifying that the bank received the "1" and that the test system has been put on hold while the call is transferred to an agent. Upon completion, the test finishes as depicted by icon 160, the stop test icon. The test code associated with icon 160 stops the test and disconnects the call.

Icon 60 test code is encountered upon the test system selecting to get a mortgage rate by supplying a tone to the bank system similar to the tone produced by a "2" on a touch tone phone. The test code verifies the tone was received by the bank system and that the bank system is ready to respond to the request.

Icon 70 represents the test code verifying that the message playing today's mortgage rates was received by the test system. After this the icon 160, described above, is encountered and the test stops.

Icon 80 test code is encountered upon the system generating a tone to the bank similar to the tone produced by pressing a "1" on a touch tone phone. This test code verifies that the tone was received by the bank IVR system. The next icon 90 represents test code for verifying that that the prompt "Please enter account number" was properly received.

Icon 100 represents test code for providing the account number to the bank and verifies that the account number was properly received. Up to this point, all the behavior of the application has been deterministic, in that it does not change from call to call, and can be tested properly as described above. However, for security and/or other reasons, some IVR systems are employing non-deterministic behavior. Non-deterministic behavior has a random or dynamic piece to it, such that a call will not always follow the same flow every time.

Icon 110 represents test code and the first instance of non-deterministic or dynamic behavior. For some banking IVR systems as a security precaution the system will randomly ask for either the user's mother's maiden name or for the user's date of birth. The choice as to which security check to ask is entirely random, and as such cannot be determined beforehand.

The present invention provides a method of handling this non-deterministic behavior. When the test code associated with icon 100 is executed it expects to receive the prompt "please say mother's maiden name". In the event that this prompt is received, the test code associated with icon 120 is then executed, which provides the mother's maiden name to the bank IVR system. Following this, test code associated with icon 150 is executed which verifies that the balance was received from the bank IVR system, then the code of icon 160 is executed which ends the test.

In the event the expected prompt "Please say mother's maiden name" is not received, instead of indicating an error condition and ending the test, the other acceptable response "Please enter date of birth" for this point in the call flow is anticipated, as indicated by the test code associated with icon 130. If the response from the IVR system was "Please enter date of birth", then the test system executes the code associated with icon 140 and responds with the correct birth date for this account. Upon supplying the correct birth date, the balance is received from the bank in accordance with the test code of icon 150 and the test is complete. Should neither of the acceptable alternate behaviors be detected than an error is indicated and the test ends.

As described above the present invention is useful for testing applications that include non-deterministic behavior. The presently disclosed method provides test code for testing deterministic behavior of an application. When instances of non-deterministic behavior of the application being tested are encountered, the method provides acceptable alternate behaviors, such that the non-deterministic behavior can be effectively tested. The method may be implemented as a software test tool that utilizes a graphical programming interface to make the test generation simple and easy to use.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of generating test scripts comprising the steps of:
   providing test code for testing deterministic behavior of an application;
   providing test code for testing dynamic behavior within said application by providing test code for each of one or more acceptable alternate behaviors associated with said dynamic behavior; and
   aggregating said test code for testing deterministic behavior of an application and said test code for testing dynamic behavior within said application into a test script.

2. The method of claim 1 wherein said step of providing test code for testing one or more acceptable alternate behaviors is done graphically.

3. The method of claim 2 wherein said step of providing test code for testing one or more acceptable alternative behaviors comprises a graphical interface wherein icons represent said acceptable alternate behaviors.

4. The method of claim 3 further comprising the step of using arrows to graphically represent the paths to icons representing said acceptable alternate behaviors.

5. The method of claim 1 wherein said test script is used for testing Interactive Voice Response (IVR) applications.

6. The method of claim 1 wherein said step of providing test code for testing one or more acceptable alternate behaviors is provided separately and is referenced by said test code.

7. A computer program product comprising a computer usable medium having computer readable code thereon comprising:
   instructions for generating test code for testing deterministic behavior of an application;
   instructions for generating test code for testing dynamic behavior by testing one or more acceptable alternative behaviors associated with said dynamic behavior; and
   instructions for aggregating said test code for testing deterministic behavior of an application and said test code for testing dynamic behavior within said application into a test script.

8. The computer program product of claim 7 wherein said test code for testing one or more acceptable alternate behaviors is provided through a graphical interface.

9. The computer program product of claim 8 wherein said test code for testing one or more acceptable alternative behaviors is utilized by a graphical interface wherein icons represent said acceptable alternate behaviors.

10. The computer program product of claim of claim 8 wherein arrows are used to graphically represent the paths to icons representing said acceptable alternate behaviors.

11. The computer program product of claim 7 wherein said application comprises an Interactive Voice Response (IVR) application.

12. The computer program product of claim 7 wherein said test code for testing one or more acceptable alternate behaviors is provided as a separate entity and is referenced by said test code.

* * * * *

UNITED STATES PATENT AND TRADEMARK OFFICE
CERTIFICATE OF CORRECTION

PATENT NO. : 6,957,420 B2
DATED : October 18, 2005
INVENTOR(S) : Wesley C. Hand, Jr. et al.

It is certified that error appears in the above-identified patent and that said Letters Patent is hereby corrected as shown below:

Title page,
Item [73], Assignee, "E m pirix" should read -- Empirix --.

Column 6,
Line 29, "product of claim of claim 8" should read -- product of claim 8 --.

Signed and Sealed this

Tenth Day of January, 2006

JON W. DUDAS
*Director of the United States Patent and Trademark Office*